United States Patent Office 3,127,428
Patented Mar. 31, 1964

3,127,428
PROCESS FOR CONVERTING A 3-KETO-Δ$^{1,4}$-STEROID TO THE CORRESPONDING 3-KETO Δ$^{1,5}$-COMPOUND
Masato Tanabe, Palo Alto, Calif., and Elliot L. Shapiro, Cedar Grove, N.J., assignors to Schering Corporation, Bloomfield, N.J., a corporation of New Jersey
No Drawing. Filed Jan. 16, 1963, Ser. No. 251,744
9 Claims. (Cl. 260—397.4)

This application relates to a novel process for effecting a partial deconjugation of a cross-conjugated system in steroids. More particularly, this application relates to a novel process whereby a steroid possessing a 3-keto-Δ$^{1,4}$-cross-conjugated system is partially deconjugated thereby producing a steroid having a 3-keto-Δ$^{1,5}$-configuration. More specifically, this application relates to a novel process for converting a 3-keto-Δ$^{1,4}$-steroid to a 3-keto-Δ$^{1,5}$-steroid.

Specifically, by our process, a steroid having a 3-keto-Δ$^{1,4}$-cross-conjugated system is subjected to the action of an isomerization agent, for example, sodium acetylide, sodium amide, or sodium hydride, in a solvent which does not give a proton, such as dimethylsulfoxide, dimethylformamide, or tetrahydrofuran, whereby partial deconjugation occurs (i.e., the 3-keto-Δ$^{1,4}$-system is deconjugated), and there is obtained directly a steroid having a 3-keto-Δ$^{1,5}$- system.

The isomerization agents contemplated in this invention include alkali metal acetylides such as sodium acetylide, lithium acetylide and potassium acetylide, alkali metal alkyl-substituted acetylides such as sodium methyl acetylide, alkali metal hydrides such as sodium hydride and calcium hydride, alkali metal amides such as sodium amide and lithium amide, and alkali metal substituted alkyl derivatives such as sodium triphenylmethyl.

Our process is carried out in a solvent which does not give up a proton. Solvents included within this definition are dimethylsulfoxide, tetrahydrofuran, dioxane, benzene, xylene, dimethylformamide, dimethylacetamide, monoglyme (ethylene glycol dimethyl ether), diglyme (diethylene glycol dimethyl ether), and the like.

Preferred isomerization agent/solvent mixtures for use in our process are sodium hydride in tetrahydrofuran, sodium amide in tetrahydrofuran, and sodium acetylide in dimethylsulfoxide or dimethylformamide.

In one preferred mode of our invention, a 3-keto-1,4-androstadiene, e.g., 17α-methyl-1,4-androstadiene-17β-ol-3-one, is allowed to react with sodium acetylide in dimethylsulfoxide at room temperature for a short period of time, i.e., from about 15 to 30 minutes. Isolation of the Δ$^{1,5}$-steroid, e.g., 17α-methyl-1,5-androstadiene-17β-ol-3-one may be effected by pouring the reaction mixture into ice water and extracting with methylene chloride according to known techniques.

In another preferred mode of our invention, a 3-keto-Δ$^{1,4}$-steroid, e.g., 17,20;20,21-bis-methylenedioxy-1,4-pregnadiene-3,11-dione, is allowed to react with sodium amide in tetrahydrofuran at reflux temperature (64–66° C.) for several hours, i.e., about 16 hours. Isolation of the Δ$^{1,5}$-steroid, e.g., 17,20;20,21 - bis-methylenedioxy - 1,5-pregnadiene-3,11-dione is effected by adding the cooled reaction mixture to a saturated boric acid solution followed by extraction with ether, then chromatography on Florisil utilizing known techniques.

In our process, when the starting steroid has a cortical side chain, such as in prednisone, it is preferable to protect the side chain at C–17 prior to reaction with the isomerization agent in order to minimize possible competing side reactions, such as the rearrangement of the side chain to form a D-homosteroid, or possibel reaction of the 20-keto- with, for example, sodium acetylide, whereby there may be formed a 20-hydroxy-20-ethinyl derivative. Typical derivatives suitable for protecting the cortical side chain are the 17,20;20,21-bis-methylenedioxy function, the 17,21 - acetonide derivative, and 17,21 - diesters, e.g., 17,21-diacetate, all of which are prepared by procedures well known in the art. The 17,21-acetonide and the 17,21-diacetate hinder the 20-ketone group, minimizing the possibility of reaction with sodium acetylide, for example. On the other hand, the 20-ketal and the 17,20;20,21-bis-methylenedioxy derivatives actually convert the 20-ketone to a non-reactive derivative, thus protecting the cortical side chain from the alkaline nature of the isomerization reagent which would cause unwanted rearrangements. Thus, prednisone may be converted either to the corresponding 17,21-acetonide, 17,21-diacetate, or the corresponding 17,20;20,21-bis-methylenedioxy derivative and, by way of example, when each are reacted either with sodium acetylide in dimethylsulfoxide or, alternatively, sodium amide in tetrahydrofuran according to our process, there is obtained the corresponding 3-keto-Δ$^{1,5}$-derivative, namely 1,5-pregnadiene-17α,21-diol-3,11,20-trione 17,21-acetonide, or 17,21-diacetate, or 17,20;20,21-bis-methylenedioxy-1,5-pregnadiene-3,11 - dione, respectively. Mild acid hydrolysis of each of the foregoing derivatives yields 1,5-pregnadiene-17α,21-diol-3,11,20-trione.

In steroids not having a cortical side chain, such as 1-dehydroprogesterone, or 17α-hydroxy-1-dehydroprogesterone, preparation of a 20-ketal derivative, e.g., the 20-ethyleneketal according to known procedures, is desirable prior to reaction with the isomerization agent. Thus, 1,4-pregnadiene-3,20-dione is reacted with ethylene glycol and the resulting 20-ethylene-dioxy-1,4-pregnadiene-3-one subjected to the action of sodium acetylide in dimethylsulfoxide according to our process whereby one obtains 20-ethylenedioxy-1,5-pregnadiene-3-one. Cleavage of the 20-ketal is effected in a weak acid medium according to known techniques to obtain the free 20-keto compound, 1,5-pregnadiene-3,20-dione. In those 1,4 - pregnadienes devoid of a 17-hydroxy function, isomerization agents other than sodium acetylide may be used without prior protection of the 20-ketone group.

In general, when carrying out our process and utilizing an alkali metal acetylide such as sodium acetylide as isomerization agent, any reactive ketone group such as at C–17 or C–20 is preferably protected by formation of a ketone derivative prior to reaction of the steroid with the alkali metal acetylide. The more hindered, less reactive ketones, such as the 11-ketone, need not be protected.

The starting compounds for our process may be any steroid having a 3-keto-Δ$^{1,4}$- system in the A ring, with those having a reactive ketone or a cortical side chain at C–17 being preferably protected as described hereinabove. Thus, suitable starting steroids include 3-keto-1,4-pregnadienes, such as prednisone (1,4-pregnadiene-17α,21-diol-3,11,20-trione),
prednisolone (1,4-pregnadiene-11β,17α,21-triol-3,20-dione),
dexamethasone (9α-fluoro-16α-methyl-1,4-pregnadiene-11β,17α,21-triol-3,20-dione),
6α-methyl-1,4-pregnadiene-11β,17α,21-triol-3,20-dione,
6α-fluoro-1,4-pregnadiene-11β,17α,21-triol-3,20-dione,
1-dehydroprogesterone (1,4-pregnadiene-3,20-dione),
17α-hydroxy-1-dehydroprogesterone (1,4-pregnadiene-17α-ol-3,20-dione),
9α,11β-dichloro-17α-hydroxy-1-dehydroprogesterone 17-acetate, and 3-keto-1,4-androstadienes, such as, 1-dehydrotestosterone (1,4-androstadiene-17β-ol-3-one), and 17α-methyl-1,4-androstadiene-17β-ol-3-one. The 3-keto-Δ$^{1,4}$-steroid starting compounds of our process need not necessarily be a member of the pregnane or androstane series, it being only necessary that the starting compounds possess a 3-keto-$\Delta^{1,4}$- system and that any reactive groups be preferentially protected as described hereinabove.

It is thus apparent from the foregoing, that the 3-keto-$\Delta^{1,4}$- starting compounds of our novel process may be substituted at one or more carbons on the steroid nucleus, particularly at positions 2, 4, 6, 9, 11, and 16, which substituents are introduced by methods well known in the art.

In our process we usually use an excess of isomerization agent, e.g., sodium acetylide, sodium amide, or sodium hydride, with respect to the molar quantity of 3-keto-$\Delta^{1,4}$- starting steroid. In general, there should be present for each mole of starting 3-keto-$\Delta^{1,4}$- steroid at least an equimolar quantity of isomerization agent plus an added molar quantity for each hydroxyl group or ester thereof that may be present, although even larger molar excesses of basic agent may be used. Thus, when converting 17$\alpha$-methyl-1,4-androstadiene-17$\beta$-ol-3-one to the corresponding 1,5-diene by our process there should be present at least two moles of the isomerization agent, e.g., sodium acetylide, for each mole of steroid.

Our process may be effected at temperatures ranging from $-10°$ C. to about $90°$ C., preferably in the range of $20°$ C. to $60°$ C., and usually at room temperature.

The reaction time which affords optimum yields for the conversion of a 3-keto-$\Delta^{1,4}$- steroid to a 3-keto-$\Delta^{1,5}$- steroid varies with the starting compound and isomerization agent/solvent system used. With sodium acetylide in dimethylsulfoxide, for example, conversion of a $\Delta^{1,4}$-steroid such as 17$\alpha$-methyl-1,4-androstadiene-17$\beta$-ol-3-one is completed in less than a half-hour; whereas, reaction of the 17,20;20,21-bis-methylenedioxy derivative of prednisone with sodium hydride in tetrahydrofuran to form the 17,20;20,21-bis-methylenedioxy derivative of 1,5-pregnadiene-17$\alpha$,21-diol-3,11,20-trione gives best results when run several hours.

Under the conditions of our process, when higher temperatures are employed, i.e., in the range of about 55–90° C., any ester groups present in the starting $\Delta^{1,4}$-compound will usually be hydrolyzed. If an ester is desired as the final product, esterification according to known techniques may be effected after the partial deconjugation of the 3-keto-$\Delta^{1,4}$- steroid to the 3-keto-$\Delta^{1,5}$- steroid. Thus, prednisone diacetate, upon reaction with sodium amide in tetrahydrofuran at reflux temperature according to our process is converted to 1,5-pregnadiene-17$\alpha$,21-diol-3,11,20-trione, which upon reaction with acetic anhydride in pyridine according to known techniques may be converted to the corresponding 21-acetate.

When lower temperatures are employed in our process, i.e., around room temperature or lower, an ester group present in the starting steroid may remain unchanged during our process depending upon the reaction on time employed, the less hindered esters becoming hydrolyzed sooner than the more hindered esters. By regulating the reaction time and temperature used in our process, one can regulate the degree of saponification and thereby the amount of ester remaining in the product. For example, 17$\alpha$-methyl-1,4-androstadiene-17$\beta$-ol-3-one 17-acetate may be subjected to sodium acetylide in dimethylformamide at room temperature for three hours and be transformed principally to 17$\alpha$-methyl-1,5-androstadiene-17$\beta$-ol-3-one. If the reaction is terminated after 15 minutes, a substantial amount of the 3-keto-1,5-diene 17-acetate may be obtained.

Our process whereby a 3-keto-$\Delta^{1,4}$-steroid is converted to a 3-keto-$\Delta^{1,5}$- steroid is preferentially, although not necessarily, carried out under an inert atmosphere, such as, argon or nitrogen. For example, when the starting steroid contains a halogen substituent, e.g., 6$\alpha$-fluoroprednisolone, optimum yields of the corresponding 1,5-diene-one, 6-fluoro-1,5-pregnadiene-11$\beta$,17$\alpha$,21-triol-3,20-dione are obtained when our process is carried out under an inert atmosphere.

In our process, after reaction of a 3-keto-$\Delta^{1,4}$- steroid with an isomerization agent in a solvent which does not give up a proton, the desired 3-keto-$\Delta^{1,5}$- steroid is isolated by first adding the reaction mixture to a protic reagent such as water, an alcohol, or an acid, followed by extraction of the 3-keto-$\Delta^{1,5}$- steroid with a suitable organic solvent. Water is most generally used as the protic agent, either alone or together with an alcohol such as methanol or ethanol, or together with a suitable acid, e.g., lower alkyl fatty acid, such as acetic acid or with other weak acids such as boric acid and phenol. For optimum yields, it is important that after addition of the reaction mixture to the protic reagent, the resultant protic medium be suitably buffered to a pH near neutrality, and/or the 3-keto-1,5-bis-dehydro product be immediately extracted from the protic medium. Thus, for example, after reacting 17$\alpha$-methyl-1,4-androstadiene-17$\beta$-ol-3-one with sodium acetylide in dimethylsulfoxide according to our process, and addition of the reaction mixture of ice water (as the protic reagent), best results are obtained when the 1,5-bis-dehydro steroid, 17$\alpha$-methyl-1,5-androstadiene-17$\beta$-ol-3-one is immediately extracted with an organic solvent and the extracts washed to neutrality. Similarly, after reaction of prednisone-17,20;20,21-bis-methylenedioxy with sodium amide in tetrahydrofuran, maximum yields of the desired 1,5-dehydro steroid are obtained when the reaction mixture is added to a sufficient quantity of saturated boric acid solution so that the pH of the resultant aqueous protic medium is near to neutrality, immediately followed by extraction with a solvent such as ether.

By our process there may be prepared therapeutically valuable 3-keto-1,5-pregnadienes such as the following described in U.S. Patent No. 2,908,696.

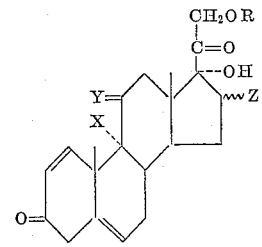

wherein X is hydrogen or a halogen having an atomic weight less than 126; Y may be keto or H,$\beta$OH; Z may be H, or an alkyl radical having up to 8 carbon atoms; and R is hydrogen or lower alkanoyl.

These above 3-keto-1,5-pregnadienes were previously prepared by a two-step process wherein there is first prepared a 6-substituted intermediate (e.g., a 6-bromo or a 6-alkanoyloxy steroid) which is then further reacted with zinc in a lower fatty alcohol, for example. These 3-keto-1,5-pregnadienes may now be prepared by our process which eliminates the necessity of preparing an intermediary 6-substituted steroid, many of which are difficult to prepare.

Our process is of particular value in preparing 3-keto-1,5-androstadienes, such as the orally effective anabolic agents, 17$\alpha$-methyl-1,5-androstadiene-17$\beta$-ol-3-one and esters thereof described in the co-pending application of Shapiro and Oliveto, Serial No. 251,747, filed January 16, 1963.

The 3-keto-1,5-androstadienes and 3-keto-1,5-pregnadienes prepared from the corresponding $\Delta^{1,4}$- steroids by our process are also valuable as intermediates in preparing the corresponding 3($\alpha$ and $\beta$)-hydroxy-$\Delta^{1,5}$- steroids, a new class of compounds described in the about-to-be-filed application of Tanabe and Oliveto, Serial No. 263,441, filed March 7, 1963. These 3-hydroxy-1,5-dienes, in general, exhibit enhanced activity over their respective 3-keto precursor. Many of the 3-hydroxy-1,5- diene transformation products are themselves useful intermediates, such as in the preparation of 6-substituted analogs, e.g., 6α- and 6β-fluoro, methyl, and the like.

Thus, a 3-keto-1,5-diene, e.g., 17α-methyl-1,5-androstadiene-17β-ol-3-one, upon reduction by means of an alkali metal aluminum or borohydride (lithium aluminum hydride, sodium borohydride, etc.), or a metal alkoxide (e.g., aluminum isopropoxide) or aluminum t-butylate is converted to the corresponding 3-hydroxy-1,5-diene, e.g., 17α-methyl-1,5-androstadiene 3(α and β),17β-diol, separable via fractional crystallization and chromatographic techniques into the 3α- and 3β-hydroxy isomers, 17α-methyl-1,5-androstadiene-3α,17β-diol and 17α-methyl-1,5-androstadiene-3β,17β-diol, respectively, both of which are valuable as anabolic agents.

Prior to reduction of a 3-keto-1,5-diene to a 3-hydroxy-1,5-diene by the above described process, any ketones present at C-17 or C20, in the case of pregnadienes, should preferably be protected by a group such as an ethylene ketal or bis-methylenedioxy derivative. Thus, for example, the 17,20:20,21-bis-methylenedioxy derivative of 1,5-pregnadiene-11β,17α,21-triol-3,20-dione is reduced with sodium borohydride in water to the 17,20;20,21-bis-methylenedioxy derivative of 1,5-pregnadiene-3(α and β),11β,17α,21-tetrol-20-one, which upon mild acid hydrolysis will yield 1,5-pregnadiene-3(α and β),11β,17α,21-tetrol-20-one, separable to the 3α- and 3β-hydroxy isomers via chromatographic techniques, both of which are valuable as anti-inflammatory agents.

In the conversion of a 3-hydroxy-1,5-diene to a 3-keto-6-substituted-1,4-diene, the transformation is effected utilizing known techniques. After protection of any ketone present at C-17 or C20, epoxidation of the Δ⁵- bond by means of a per-acid, followed by treatment of the resulting 5α,6α-epoxy with hydrofluoric acid or a Grignard reagent such as methyl magnesium iodide yields the corresponding 5α-hydroxy-6β-fluoro- or 5α-hydroxy-6β-methyl-Δ¹-3β-ol intermediate, respectively. Manganese dioxide oxidation of the 3β-hydroxy to a 3-keto group followed by dehydration of the 5α-hydroxy function with a reagent such as thionyl chloride in pyridine will yield the corresponding 3-keto-6β-fluoro- and 3-keto-6β-methyl-1,4-dienes, respectively. Epimerization to the 6α-isomers may be effected with a base such as potassium t-butoxide in t-butanol to obtain the 3-keto-6α-fluoro- and 3-keto-6α-methyl-1,4-diene, respectively.

Compounds of the following general Formula I which may be prepared from the corresponding 3-keto-1,4-dienes by our novel process are illustrative of the 3-keto-1,5-dienes useful as intermediates in the production of the corresponding 3-hydroxy-1,5-dienes.

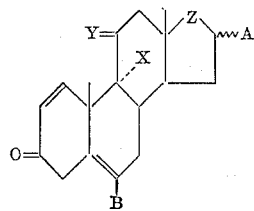

wherein A represents hydrogen, lower alkyl, α-hydroxy, and α-lower alkanoyloxy; B represents hydrogen, methyl, and fluoro; Y represents keto (H,βOH), (H,αOH), and (H,β-halogen); X represents hydrogen and halogen, and when Y is (H,αOH), X is hydrogen, and when Y is (H,β-halogen), X is halogen; and X and Y together represent an epoxy or a 9(11)-bond; and Z is a member of the group consisting of

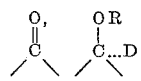

and

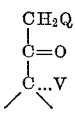

R being a member of the group consisting of hydrogen or lower alkanoyl, D being a member of the group consisting of hydrogen, lower alkyl, ethinyl, halogenoethinyl, or alkyl ethinyl, V being a member of the group consisting of hydrogen, hydroxy, and lower alkanoyloxy, and Q is a member of the group consisting of hydrogen, hydroxy, acyloxy, halogen, or lower alkyl.

The following are examples to illustrate the novel process of this invention, but are not to be construed as limiting; the scope of our invention being limited only by the appended claims.

EXAMPLE 1

*17α-Methyl-1,5-Androstadiene-17β-Ol-3-One*

Add 44 ml. of a suspension of 20% sodium acetylide in xylene to 100 ml. of dimethylsulfoxide in which is dissolved 5 g. of 17α-methyl-1,4-androstadiene-17β-ol-3-one. Stir the reaction mixture at room temperature for approximately 30 minutes, then pour the mixture slowly into 1.5 l. of ice water. Add sodium chloride to this mixture until the aqueous phase is saturated, then extract with methylene chloride. Combine the methylene chloride extracts, wash with water, then dry over magnesium sulfate and evaporate in vacuo on a steam bath to a crystalline residue of about 5 g. of 17α-methyl-1,5-androstadiene-17β-ol-3-one. Purify by crystallizing from acetone-hexane. Yield of purified 17α-methyl-1,5-androstadiene-17β-ol-3-one=3.75 g. (75%). M.P. 194–198° C., $[\alpha]_D$ +43.9

(dioxane)

$\lambda_{max.}^{methanol}$ 226 m$\mu$ ($\epsilon$ 11,250)

EXAMPLE 2

*1,5-Pregnadiene-17α,21-Diol-3,11,20-Trione*

(A) *1,5-pregnadiene-17α-21-diol-3,11,20-trione 17,21-acetonide.*—In a manner similar to that described in Example 1, allow 100 mg. of 1,4-pregnadiene-17α,21-diol-3,11,20-trione 17,21-acetonide to react with 1 ml. of sodium acetylide suspension in the presence of 2 ml. of dimethylsulfoxide for 1 hour at room temperature. Isolate the resulting product in the described manner and purify by crystallizing from acetone-hexane to give 1,5-pregnadiene-17α,21-diol-3,11,20-trione 17,21-acetonide.

(B) *1,5 - pregnadiene - 17α,21 - diol-3,11,20-trione.*—Dissolve the 1,5-pregnadiene-17α,21-diol-3,11,20-trione 17,21-acetonide prepared in Example 2A in 3 ml. of 90% aqueous acetic acid. Allow the resulting solution to remain at room temperature for approximately 17 hours, then dilute with water. Collect the resulting precipitate of 1,5-pregnadiene-17α,21-diol-3,11,20-trione by filtration. Purify by pouring a methylene chloride solution of the 1,5-pregnadiene-17α,21-diol-3,11,20-trione onto a Florisil column dampened with methylene chloride. Elute first with methylene chloride; then with methylene chloride/acetone mixtures; combine the fractions of methylene chloride together with those methylene chloride/acetone mixtures which by spectroscopic (U.V.) evaluation contain substantially the 3-keto-1,5-diene product. Concentrate the combined fractions in vacuo to a residue comprising 1,5-pregnadiene-17α,21-diol-3,11,20-trione.

EXAMPLE 3

*1,5-Pregnadiene-17α,21-Diol-3,11,20-Trione*

(A) *17,20;20,21-bis-methylenedioxy-1,5-pregnadiene-3,11-dione.*—(1) Wash 10 g. of sodium hydride (50% in mineral oil) with dry tetrahydrofuran twice by decantation, then add to 300 ml. of dry tetrahydrofuran. To this suspension of sodium hydride in tetrahydrofuran, add 5 g. of 17,20;20,21-bis-methylenedioxy-1,4-pregnadiene-3,11-dione. Stir the mixture at reflux temperature under a nitrogen atmosphere for 16 hours, then cool, pour cautiously into 400 ml. of saturated boric acid solution, and extract with ether. Combine the ether extracts and evaporate to a residue comprising 17,20;20,21-bis-methylenedioxy-1,5-pregnadiene-3,11-dione. Purify by crystallizing from acetone. Yield=1.6 g. (36%). M.P. 195–204° C. After further purification by several recrystallizations from acetone, M.P. 204–215° C.

(2) To a solution of 5.8 g. of 17,20;20,21-bis-methylenedioxy-1,4-pregnadiene-3,11-dione in 120 ml. of anhydrous tetrahydrofuran add 1.5 g. of sodium amide. Stir the mixture at reflux temperature under a nitrogen atmosphere overnight, then cool and pour into 800 ml. of a saturated aqueous boric acid solution. Separate the organic layer from the aqueous solution, then extract the aqueous solution with ether. Add the ether extracts to the original organic layer and evaporate in vacuo to a residue comprising 17,20;20,21-bis-methylenedioxy-1,5-pregnadiene-3,11-dione. Purify by chromatography on Florisil isolating the purified product from the benzene fractions. Yield=3.1 g. M.P. 204–215° C.

(B) *1,5-pregnadiene-17α,21-diol-3,11,20-trione.*—Dissolve 0.1 g. of 17,20;20,21-bis-methylenedioxy-1,5-pregnadiene-3,11-dione in 12 ml. of 70% aqueous acetic acid. Allow the solution to remain at room temperature for 48 hours, then dilute with water and extract with chloroform. Combine the chloroform extracts and evaporate to a residue comprising 1,5-pregnadiene-17α,21-diol-3,11,20-trione. Purify by crystallization from acetone-hexane.

EXAMPLE 4

*1,5-Pregnadiene-11α,17α,21-Triol-3,20-Dione*

(A) *1,5-pregnadiene-11α,17α,21-triol-3,20-dione 17,21-acetonide.*—Add 3 ml. of an approximately 18% suspension of sodium acetylide in xylene to a solution of 0.3 g. of 1,4-pregnadiene-11α,17α,21-triol-3,20-dione 17,21-acetonide in dimethylsulfoxide. Stir the reaction mixture at room temperature for one hour, then pour into ice water and extract with ethyl acetate. Combine the ethyl acetate extracts and evaporate to a residue substantially of 1,5-pregnadiene-11α,17α,21 triol-3,20-dione. 17,21-acetonide. Purify by chromatography over 10 g. of silica gel eluting with ether/hexane. Combine like fractions which by ultra-violet evaluation contain the 3-keto-1,5-diene system. Evaporate and crystallize the resultant residue from ether. M.P. 196–199° C. $[\alpha]_D$+76.9 (dioxane)

$\lambda_{max.}$ 226 m$\mu$ ($\epsilon$ 13,300)

(B) *1,5 - pregnadiene - 11α,17α,21 - triol-3,20-dione.*—Treat the 17,21-acetonide prepared in Example 4A with 90% aqueous acetic acid in the manner of Example 2B. Isolate the resultant product in the described manner to give 1,5-pregnadiene-11α,17α,21-triol-3,20-dione.

EXAMPLE 5

*1,5-Androstadiene-17β-Ol-3-One*

Add 7 ml. of an approxímtaely 18% suspension of sodium acetylide in xylene to a solution of 0.8 g. of 1,4-androstadiene-17β-ol-3-one in 16 ml. of dimethylsulfoxide. Stir the reaction mixture under an atmosphere of nitrogen for 50 minutes, then pour cautiously into ice water. Extract the aqueous mixture with ethyl acetate, then combine the extracts and evaporate to a residue of substantially 1,5-androstadiene-17β-ol-3-one. Purify by chromatography over 20 g. of Florisil eluting with ether-hexane. Combine like fractions which by ultra-violet evaluation contain the 3-keto-1,5-diene system and evaporate to a residue. Crystallize the residue from acetone-hexane. M.P. 147–149° C. $[\alpha]_D$+60.9 (diozane)

$\lambda_{max.}^{methanol}$ 226 m$\mu$ ($\epsilon$ 10,500)

EXAMPLE 6

*17α-Methyl-1,5-Androstadiene-17β-Ol-3-One 17-Acetate*

(A) *17α-methyl-1,4-androstadiene-17β-ol-3-one 17 acetate.*—Dissolve 17α-methyl - 1,4 - androstadiene-17β-ol-3-one (0.1 g.) in 1 ml. of pyridine and 0.5 ml. of acetic anhydride. Heat the reaction mixture on the steam bath for 10–20 hours. Dilute with water followed by additional dilution with aqueous hydrochloric acid. Filter the resultant precipitate of substantially 17α-methyl-1,4-androstadiene-17β-ol-3-one 17-acetate. Purify by crystallization from aqueous methanol.

(B) *17α-methyl-1,5-androstadiene-17β-ol-3-one 17 acetate.*—To a solution of 2 g. of 17α-methyl-1,4-androstadiene-17β-ol-3-one 17-acetate in 40 ml. of dimethylformamide under an atmosphere of nitrogen add 25 ml. of an approximately 18% suspension of sodium acetylide in xylene. Stir for 15 minutes at room temperature, then pour into ice water. Extract the resultant mixture with methylene chloride, then combine the organic extracts and evaporate to a residue. Chromatograph the residue over 200 g. of silica gel. Combine the ether in hexane eluates which by ultra-violet evaluation contain the 3-keto-1,5-diene product and evaporate to a residue of substantially 17α-methyl-1,5-androstadiene-17β-ol-3-one 17-acetate. Purify by crystallization from acetone-hexane. M.P. 163–166° C., $[\alpha]_D$+50.9 (dioxane)

$\lambda_{max.}^{methanol}$ 226 m$\mu$ ($\epsilon$ 11,080)

In the above-described procedure, by changing the reaction time from 15 minutes to three hours, there is obtained the 17-alcohol, i.e., 17α-methyl-1,5-androstadiene-17β-ol-3-one.

EXAMPLE 7

*1,5-Pregnadiene-11β,17α,21-Triol-3,20-Dione*

(A) *17,20;20,21 - bis-methylenedioxy-1,5-pregnadiene-11β-ol-3-one.*—Add 1.51 l. of 20% sodium acetylide in xylene to a solution of 37.8 g. of 17,20;20,21-bis-methylenedioxy-1,4-pregnadiene-11β-ol-3-one in 1.51 l. of dimethylformamide. Stir the reaction mixture at room temperature for four hours, then pour into 20 l. of ice water; extract the aqueous solution three times with 2 l. portions of methylene chloride. Combine the methylene chloride extracts, wash to neutrality with water, dry over magnesium sulfate, filter, and evaporate to a residue comprising 17,20;20,21-bis-methylenedioxy-1,5-pregnadiene-11β-ol-3-one. Yield=36 g. Purify by crystallization from acetone. Yield=21.3 g.

$\lambda_{max.}$ 225 m$\mu$ ($\epsilon$ 11,100)

Purify further by chromatography on silica gel, eluting with ether-hexane. Combine like fractions based on ultra-violet evaluation, followed by crystallization from acetone. M.P. 244–246° C., $[\alpha]_D$−72° (dioxane)

$\lambda_{max.}^{methanol}$ 225 m$\mu$ ($\epsilon$ 11,660)

In a similar manner, 6α-methyl-17,20;20,21-bis-methylenedioxy-1,4-pregnadiene-11β-ol-3-one, 6α - fluoro-17,20; 20,21 - bis - methylenedioxy - 1,4 - pregnadiene - 11β - ol-3-one, and 9α-fluoro-16α-methyl-17,20;20,21-bis-methylenedioxy-1,4-pregnadiene-11β-ol-3-one, each upon reaction with sodium acetylide in dimethylformamide, followed by addition of the reaction mixture to ice water and isolation of the resultant product utilizing extraction and chromatographic techniques yields, respectively, 6 - methyl - 17,20;20,21 - bis - methylenedioxy - 1,5-pregnadiene-11β-ol-3-one, 6-fluoro-17,20;20,21-bis-methylenedioxy-1,5-pregnadiene-11β-ol-3-one, and 9α-methyl-17,20; 20,21-bis-methylenedioxy-1,5-pregnadiene-11β-ol-3-one.

(B) *1,5 - pregnadiene - 11β,17α,21 - triol-3,20-dione.*—Treat each of the bis-methylenedioxy-1,5-dienes of Example 7A with 70% aqueous acetic acid in the manner of Example 3B whereby one obtains 1,5-pregnadiene-11β, 17α,21-triol-3,20-dione, 6-methyl-1,5-pregnadiene-11β,17α, 21-triol-3,20-dione, 6-fluoro-1,5-pregnadiene-11β,17α,21-triol-3,20-dione, and 9α-fluoro-16α-methyl-1,5-pregnadiene-11β,17α,21-triol-3,20-dione, respectively.

EXAMPLE 8

*1,5-Pregnadiene-3,20-Dione*

Treat 1,4-pregnadiene-3,20-dione with sodium hydride in dry tetrahydrofuran in a manner similar to that described in Example 3A–1. Pour the resultant reaction mixture into saturated boric acid solution. Separate the organic layer and extract the aqueous residue with ether. Combine the organic layer and ether extracts and concentrate in vacuo to a residue comprising 1,5-pregnadiene-3,20-dione. Purify by crystallization from acetone-hexane.

We claim:

1. The process for preparing a 3-keto-1,5-bis-dehydro-steroid of the androstane and pregnane series which comprises reacting a steroid selected from the group consisting of a 3-keto-1,4-bis-dehydro-androstane and a 3-keto-1,4-bis-dehydro-pregnane with an isomerization agent selected from the group consisting of alkali metal acetylides, alkali metal hydrides, alkali metal amides and sodium triphenylmethyl in a solvent which does not give up a proton, said solvent being selected from the group consisting of an aromatic monocyclic hydrocarbon, a saturated alicyclic ether, a saturated aliphatic ether, a di-lower alkylsulfoxide, and an N,N-di-lower alkyl alkanoic acid amide.

2. The process which comprises reacting a 3-keto-1,4-bis-dehydro-steroid with at least an equimolar quantity of an isomerization agent selected from the group consisting of alkali metal acetylides, alkali metal hydrides, alkali metal amides, and sodium triphenylmethyl, in a solvent which does not give up a proton, said solvent being selected from the group consisting of an aromatic monocyclic hydrocarbon, a saturated alicyclic ether, a saturated aliphatic ether, a di-lower alkylsulfoxide, and an N,N-di-lower alkyl alkanoic acid amide and isolating the 3-keto-1,5-bis-dehydro-steroid thereby produced.

3. The process which comprises reacting a 3-keto-1,4-bis-dehydro-steroid with at least an equimolar quantity of an isomerization agent selected from the group consisting of alkali metal acetylides, alkali metal hydrides, alkali metal amides, and sodium triphenylmethyl in a solvent which does not give up a proton, said solvent being selected from the group consisting of an aromatic monocyclic hydrocarbon, a saturated alicyclic ether, a saturated aliphatic ether, a di-lower alkylsulfoxide, and an N,N-di-lower alkyl alkanoic acid amide; adding the reaction mixture to a protic reagent, said protic reagent selected from the group consisting of water, a lower alkyl alcohol, and a weak acid selected from the group consisting of a lower alkyl fatty acid, boric acid, and phenol, and extracting the 1,5-bis-dehydro-steroid thereby produced from the protic medium.

4. The process which comprises reacting a 3-keto-1,4-bis-dehydro-steroid with at least an equimolar quantity of an isomerization agent selected from the group consisting of alkali metal acetylides, alkali metal hydrides, alkali metal amides and sodium triphenylmethyl in a solvent which does not give up a proton, said solvent being selected from the group consisting of an aromatic monocyclic hydrocarbon, a saturated alicyclic ether, a saturated aliphatic ether, a di-lower alkylsulfoxide, and an N,N-di-lower alkyl alkanoic acid amide; adding the reaction mixture to a protic reagent, said protic reagent selected from the group consisting of water, a lower alkyl alcohol, and a weak acid selected from the group consisting of a lower alkyl fatty acid, boric acid, and phenol, buffering said protic medium to a pH near neutrality, and extracting the 1,5-bis-dehydro-steroid thereby produced from the protic medium.

5. The process for preparing a 3-keto-1,5-bis-dehydro-steroid of the androstane and pregnane series which comprises reacting a steroid selected from the group consisting of a 3-keto-1,4-bis-dehydro-androstane and a 3-keto-1,4-bis-dehydro-pregnane with sodium acetylide in dimethylsulfoxide.

6. The process for preparing a 3-keto-1,5-bis-dehydro-steroid of the androstane and pregnane series which comprises reacting a steroid selected from the group consisting of a 3-keto-1,4-bis-dehydro-androstane and a 3-keto-1,4-bis-dehydro-pregnane with sodium acetylide in dimethylformamide.

7. The process for preparing a 3-keto-1,5-bis-dehydro-steroid of the androstane and pregnane series which comprises reacting a steroid selected from the group consisting of a 3-keto-1,4-bis-dehydro-androstane and a 3-keto-1,4-bis-dehydro-pregnane with sodium hydride in tetrahydrofuran.

8. The process for preparing a 3-keto-1,5-bis-dehydro-steroid of the androstane and pregnane series which comprises reacting a steroid selected from the group consisting of a 3-keto-1,4-bis-dehydro-androstane and a 3-keto-1,4-bis-dehydro-pregnane with sodium amide in tetrahydrofuran.

9. The process of preparing 17α-methyl-1,5-androstadiene-17β-ol-3-one which comprises reacting 17α-methyl-1,4-androstadiene-17β-ol-3-one with sodium acetylide in dimethylsulfoxide.

No references cited.